(12) United States Patent
Artis et al.

(10) Patent No.: US 6,675,923 B1
(45) Date of Patent: Jan. 13, 2004

(54) OPERATING DEVICE FOR A CRUISE CONTROL SYSTEM OF AN AUTOMOBILE VEHICLE

(75) Inventors: Jean-Paul Artis, Plouzane (FR); Maurice Callac, Saint Renan (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/512,454

(22) Filed: Feb. 24, 2000

(30) Foreign Application Priority Data

Feb. 26, 1999 (FR) .............................. 99 02443

(51) Int. Cl.⁷ .............................................. B60K 31/02
(52) U.S. Cl. ........................................ 180/170; 180/178
(58) Field of Search ................................. 180/167, 178, 180/174, 177, 170, 179; 364/426.041, 426.042, 426.043, 426.044; 701/93, 110, 94, 95, 96

(56) References Cited

U.S. PATENT DOCUMENTS

| | | | | |
|---|---|---|---|---|
| 4,133,407 A | * | 1/1979 | Schantz ........................ | 180/108 |
| 4,181,103 A | * | 1/1980 | Sturdy ........................ | 123/320 |
| 4,353,443 A | * | 10/1982 | Lombardo .................. | 477/193 |
| 4,590,909 A | * | 5/1986 | Heintz ........................ | 123/360 |
| 4,615,409 A | | 10/1986 | Küpper et al. | |
| 5,083,542 A | * | 1/1992 | Kishimoto .................. | 123/400 |
| 5,152,360 A | * | 10/1992 | Haefner et al. ............. | 180/197 |
| 5,208,561 A | | 5/1993 | Delestre et al. | |
| 5,238,080 A | * | 8/1993 | Fastie ......................... | 180/178 |
| 5,485,892 A | * | 1/1996 | Fujita ......................... | 180/167 |
| 5,568,797 A | * | 10/1996 | Landerretche .............. | 123/396 |
| 5,774,820 A | * | 6/1998 | Linden et al. ............... | 701/93 |
| 5,923,284 A | | 7/1999 | Artis et al. | |
| 5,945,942 A | | 8/1999 | Artis et al. | |
| 6,023,238 A | | 2/2000 | Cornic et al. | |
| 6,078,860 A | * | 6/2000 | Kerns ......................... | 701/93 |
| 6,211,813 B1 | | 4/2001 | Dousset et al. | |

FOREIGN PATENT DOCUMENTS

| | | |
|---|---|---|
| EP | 0 709 245 | 5/1996 |
| FR | 2 755 650 | 5/1998 |

* cited by examiner

*Primary Examiner*—Brian L. Johnson
*Assistant Examiner*—Bridget Avery
(74) *Attorney, Agent, or Firm*—Oblon, Spivak, McClelland, Maier & Neustadt, P.C.

(57) ABSTRACT

A device for the operating of an automative cruise control system for an automobile vehicle comprises means to separate the travel of the accelerator pedal into two parts. The depressing of the pedal in the first travel part engages the automative cruise control system, the pull-back force of the pedal being smaller in the first travel part than in the second travel part. The device can be applied especially to vehicles equipped with means for checking the distance and/or the speed of obstacles located in the path of the vehicle, the pace of these vehicles being regulated or controlled as a function of the information on distance and/or speed given by said means. More generally, it can be applied to any vehicles equipped means of automative cruise control.

8 Claims, 3 Drawing Sheets

OPERATING DEVICE FOR A CRUISE CONTROL SYSTEM OF AN AUTOMOBILE VEHICLE

BACKGROUND OF THE INVENTION

1. Field of the Invention

The present invention relates to a device for the operating of a cruise control system of an automobile vehicle. It can be applied especially to vehicles equipped with means for checking the distance and/or the speed of obstacles located in the path of the vehicle, the pace of these vehicles being regulated or controlled as a function of the information on distance and/or speed given by said means. More generally, it can be applied to any vehicles fitted out with means for the automatic control of their pace.

2. Description of the Prior Art

There are known ways of equipping vehicles with means for the measurement of the distance and/or speed of vehicles or obstacles preceding them. These means, based on radar, optical or other techniques, can be used especially to carry out an automatic control of the speed of the vehicles as a function of the traffic. They are generally called adaptive or automative cruise control (ACC) devices.

These means provide information that may be exploited in different ways. One case of simple exploitation consists for example in providing a piece of visual information to the driver of the vehicle if a safety distance threshold is crossed. In this case, it is for the driver to take action, of his own accord, on the braking system of the vehicle.

A more elaborate case may implement a system of automatic braking by servo-linking the braking and/or acceleration system of the vehicle to the information given by the measurement means. In this case, the driver does not have any direct control over the pace of the vehicle. However it is necessary to provide for the possibility of giving him total command of the braking and/or acceleration system, independently of the information given by the distance and/or speed measurement means. To activate or deactivate the system for the automatic control of his vehicle, the driver generally activates a manual command device, for example a conventional push-button.

In the case of automative cruise control coupled to an ACC type radar, several manual commands are generally used. A first on/off manual command activates the automative cruise control system. A second manual command, also called a set/resume command, engages the automatic control system. In other words, with the system being in operation through the action taken on the on/off command, the engaging of the system starts up the automative cruise control system proper, namely for example the automatic control of acceleration and/or braking.

These manual commands are located, as the case may be, on a handle that is localized slightly behind the steering wheel or again on the steering wheel itself. Typically, to engage the automative cruise control system after having activated it by the on/off push-button, the driver of the vehicle presses the set/resume push-button. To activate the system, the driver may for example press the set/resume push-button a second time. A light indicator sometimes accompanied by a sound signal may for example remind the driver of the state—active or inactive—of the automative cruise control system.

This mode of control is especially well suited to the use of automative cruise control systems on motorways, for example in association with an ACC type radar. In this configuration, the periods of automative cruise control are lengthy and the traffic situation is unencumbered. The driver's work load for activating the push-buttons is light. The driver sees critical situations from afar. He therefore has sufficient time to react to these situations, especially to move his right foot in order to place it on the accelerator or brake.

In urban use, things are no longer the same. Several drawbacks appear. The periods of automatic driving are short and the driver constantly has to resume control in order to manage situations such as stopping at traffic lights, yielding to right of way, changing roads or taking sharp corners, for example. The above-described operation of the system by means of push-buttons then entails a work load and attention span that soon become unbearable for the driver. From the viewpoint of safety, this added preoccupation is not propitious, and is even dangerous. Furthermore, the driver must constantly look at his dashboard in order to know the state of his system.

SUMMARY OF THE INVENTION

The aim of the invention is to overcome the above-mentioned drawbacks, especially by reducing the work load and required attention span of the driver of a vehicle equipped with a system of automative cruise control in certain critical situations. To this end, an object of the invention is a device for the operating of an automative cruise control system for an automobile vehicle, comprising means to separate the travel of the accelerator pedal into two parts, the depressing of the pedal in the first travel part engaging the automative cruise control system and the pull-back force of the pedal being smaller in the first travel part than in the second travel part.

The main advantages of the invention are that it provides great security of operation, improves the reliability of the information on the state of operation of the control system, improves the safety of the driver and is simple to implement.

BRIEF DESCRIPTION OF THE DRAWINGS

Other characteristics and advantages of the invention shall appear from the following description made with reference to the appended drawings, of which.

MORE DETAILED DESCRIPTION

Figure 1:
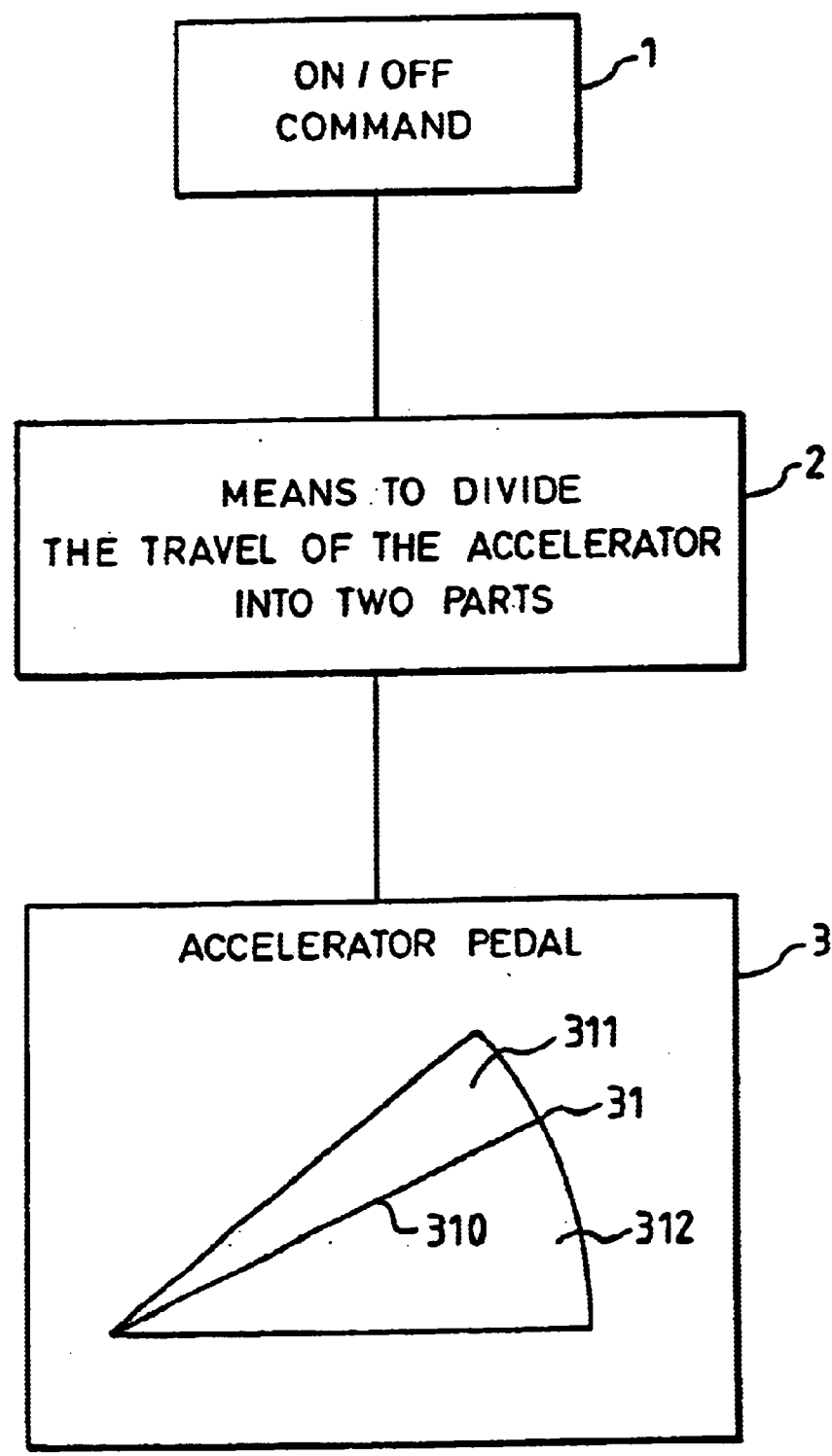
FIG. 1 is a block diagram of a possible embodiment of a device according to the invention.

FIG. 1 is a block diagram showing a possible embodiment of a device according to the invention. This device enables the change from the automative cruise control of a vehicle to control by the driver to be achieved through the accelerator pedal. The automative cruise control is obtained by known means. For example, these means comprise a computer associated with an ACC type radar that detects the distances and/or speeds of the vehicles preceding the vehicle that carries it, and command interfaces that act on the acceleration and braking system. Depending on the data given by the radar, the computer sends commands to the interfaces. A servo-control of the speed of the vehicle, going through its braking and acceleration system, is set up for example in order to maintain a minimum distance between the carrier vehicle and the vehicle immediately preceding it.

According to the invention, when the automative cruise control system is put into operation, for example by an on/off switch, mechanical means divide the total travel of the accelerator into two parts. The first travel part is preferably shorter than the second travel part. The pull-back force associated with the first travel part is smaller than the pull-back force associated with the second travel part, so that the driver appreciably senses the change from one part to another part with his foot. The first travel part of the accelerator pedal has the effect, for example, of engaging the automative control system. The second travel part of the accelerator pedal enables acceleration beyond the set value of the automative cruise control system, in particular so as to enable maneuvering or faster driving than that permitted by the system in automatic mode.

Thus, as can be seen in FIG. 1, downline from an on/off command device 1, a device according to the invention comprises means 2 to divide the travel of the accelerator pedal 3 into two parts. The on/off command device has for example the form of a push-button or any other form and is placed, for example, on the dashboard of the vehicle. Through the activation of this command, the automative cruise control system is put into a state of operation. It really works only when it has received an additional engagement command. The putting into operation of the system by the activation of the on/off command 1 will, for example, power on the computer of the control system and its associated command interfaces. For example, it also puts the radar into operation. A stopping of the system, for example by action on this on/off command device 1, similarly deactivates the control system, i.e. puts it out of operation by turning off the power to the elements of the automative cruise control system.

When the on/off command activates this control system, the abovem-entioned means 2 divide the travel 31 of the accelerator pedal 3 into two parts 311, 312. The first travel part 311 is preferably smaller than the second travel part 312. It is for example about a quarter of the total travel of the accelerator pedal. The means 2 for dividing the travel into two parts distinguish between these parts by at least two characteristics.

According to a first characteristic, the first travel part 311 has the effect of engaging the automative cruise control system while, in the second travel part 312, with the system still engaged, it is the acceleration command coming from the accelerator pedal 3 that prevails over the acceleration command coming from the automative cruise control system. In other words, when the driver's foot, placed on the accelerator pedal 3, slightly depresses the brake pedal, within the boundary of the first travel part 311, the automative cruise control system gets engaged. The pace of the vehicle, its speed, its acceleration and its braking are then controlled automatically by this system. If the situation requires greater acceleration than that demanded by this system, the driver depresses the brake pedal beyond the first travel part. In the second travel part 312, it is the acceleration produced by the accelerator pedal that determines the acceleration, which goes beyond the acceleration provided for in the control system. The driver can then perform maneuvers or drive at speeds faster than those permitted by the automative cruise control system.

According to a second characteristic, the means 2 for dividing the travel into two parts differentiate between the pull-back forces of the accelerator pedal associated with each of these travel parts, especially in such a way that the driver appreciably senses the boundary 310 between the two travel parts. It is indeed important for him to know whether or not he is in command of the acceleration. Preferably, the pull-back force of the pedal 3 is greater in the second travel part 312 than in the first travel part 311. The pull-back force is for example appreciably stronger so that the driver very appreciably senses the change from one part to the other.

Thus, with the control system being activated by prior action, for example by an on/off command, the driver engages this system by slightly depressing the accelerator pedal. In particular, because of the pull-back force linked to the second travel part, he know perfectly where to stop his action so as not to override the acceleration commanded by the system. In the event of an emergency, he naturally presses the accelerator pedal beyond the first travel part to obtain the desired acceleration.

The invention is thus very well suited to driving in urban conditions, which consists of a series of abrupt stops, slowing down and acceleration. In particular, it enables a driver to recover his usual reflexes, namely to press the accelerator in order to go forward and move his foot from the accelerator to the brake in order to slow down or stop. With the control system being still activated, the return of the brake pedal to the first travel part and then, as the case may, to the idle position, allows the automative control command to resume control, except for the braking commands if any.

During the periods of automatic driving, the driver's right foot is immobile and rests for example on the intermediate stop of the accelerator pedal. This intermediate stop is the boundary 310 between two travels, namely the place where the pull-back force of the pedal becomes greater than that of the first travel part. The driver then does not have to think in order to find out where to put his foot or know the state of the automative cruise control system. He can instantaneously and very naturally take over control in dangerous situations or when it is necessary, for example in order to comply with traffic lights or for giving right of way.

When the on/off command device, which is placed for example on the dashboard of the vehicle, is in the off position, the means used to divide the travel of the accelerator pedal into two parts become inactive. The accelerator pedal 3 recovers its normal function, namely that of controlling the engine torque, throughout its travel.

Figure 2:
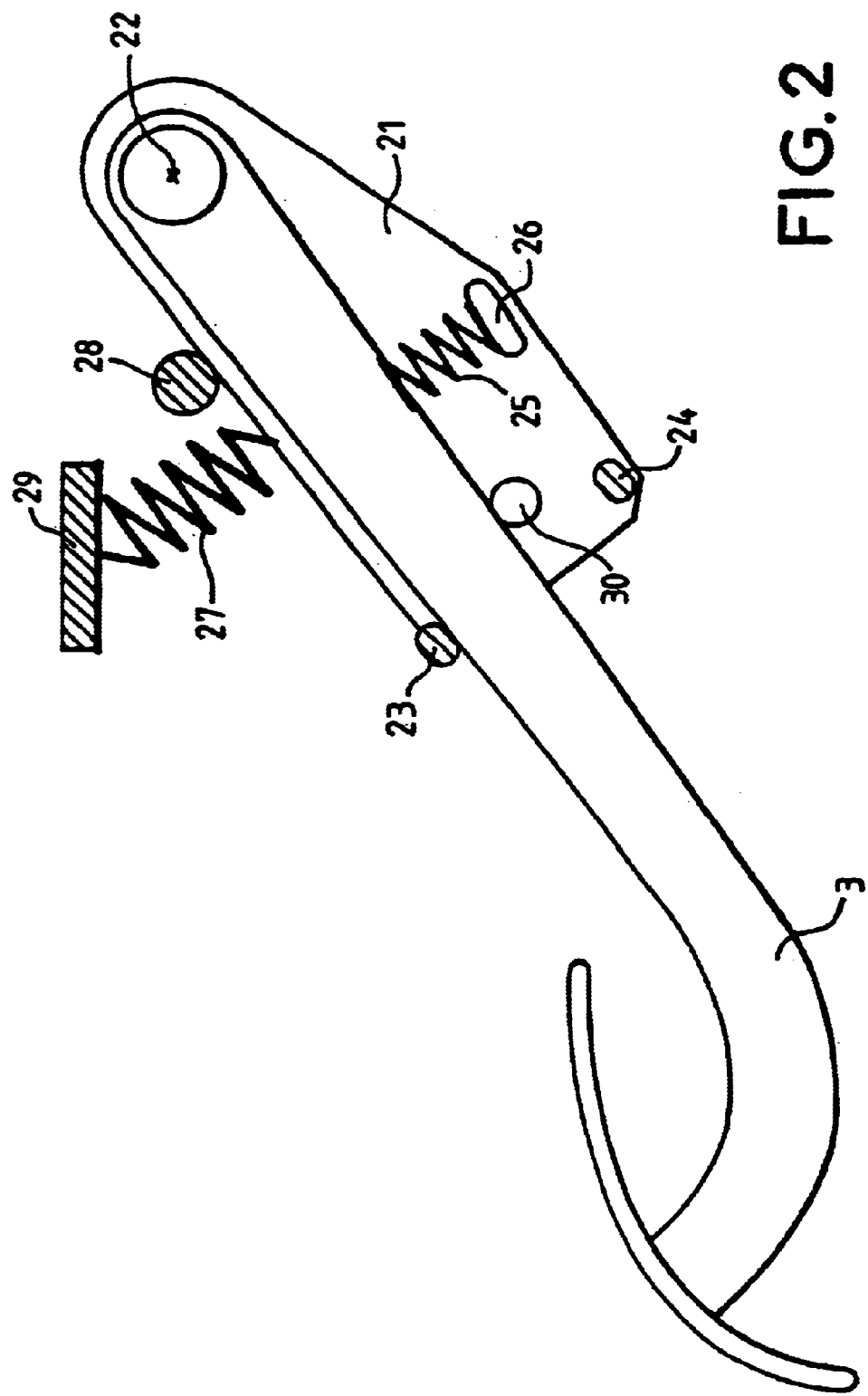
FIG. 2 shows a possible exemplary embodiment of a device according to the invention.

FIG. 2 illustrates a possible exemplary embodiment of a device according to the invention. In particular, it has a coupling or yoke 21. This yoke has a rotational pin 22 common to itself and to the accelerator pedal 3. The pedal 3 then has a degree of freedom in rotation with respect to the yoke 21. The pedal 3 is rotationally free between two stops of the yoke 21, an upper stop 23 and a lower stop 24. A first pull-back spring 25 holds the pedal 3 in contact with the upper stop 23, where there is no pressure on the accelerator pedal 3 from the driver of the vehicle. To this end, the pull-back spring 25 is for example placed between the pedal 3 and a part 26, fixed with respect to the yoke 21, that is located below the pedal. It then exerts a pull-back force that tends to stretch, namely it works under tensile forces.

A second pull-back spring 27 tends to bring the yoke 21 back upwards to keep it in contact with a stop 28 when it is at rest. To this end, the second pull-back spring is connected for example firstly to the yoke 21 and to a part 29 that is fixed with respect to the frame of the vehicle, the spring then working under compression.

A first sensor, not shown, is used to measure the position of the yoke 21 with respect to the chassis of the vehicle. A second sensor, not shown, is used to measure the position of the pedal 3 with respect to the yoke 21. These sensors are for example potentiometrical type sensors, namely the shifting of the yoke for one sensor and the shifting of the pedal for the other sensor modify the resistance of a potentiometer. The sensors thus deliver a voltage or a current that is proportional to the shifts. The position measured by the second sensor, associated with the yoke 21, controls for example the, acceleration of the vehicle, the acceleration being a function of the sensor measurement which, as it happens, is done in a known way.

The device according to the invention as illustrated in FIG. 2 furthermore comprises for example an actuatable element 30 that blocks the pedal 3 towards the upper stop 23 of the yoke 21. The pedal is left free between the two stops 23, 24 depending on the position of the actuatable element. The position of this actuatable element depends especially on the state of the on/off command device 1. This actuatable element is for example the latch of a lock, its position being commanded by an electromagnet.

When the on/off command device is in the off position, namely when the automative cruise control system is not activated and therefore not in a state of operation, the actuatable element 30 blocks the pedal 3 towards the upper stop 29 of the yoke. This element in fact keeps the pedal fixed with respect to the yoke. If the actuatable element is the latch of a lock, it is for example in the blocked position when there is no excitation of the lock, namely when there is no current in the electromagnet. The pedal 3 is then fixed with respect to the yoke between the upper stop 23 and the actuatable element. The motions of the driver's foot on the pedal 3 are entirely retransmitted to the yoke 21. The potentiometrical sensor, placed between the yoke and the chassis of the vehicle, then enables the normal effecting of the operation of the engine torque. The pedal is drawn back to the upper position towards the stop 28 by the effect of the second pull-back spring 27.

When the on/off command device 1 is in the on position, the automative cruise control system is activated. In this position, the on/off command device 1 furthermore activates the shifting of the actuatable element 30 so as to release the pedal 3 and leave it free between the two stops 23, 24 of the yoke. If the actuatable element 30 is the latch of a lock operated by an electromagnet, the on/off command device 1 in the on state acts for example on a supply circuit of the coil of the electromagnet so that it is crossed by a current 1. The passage of this current 1 into the coil then keeps the latch withdrawn so as to release the brake pedal 3. This pedal 3 is then movable between the two stops 23, 24 of the yoke, and is only drawn back towards the upper stop 23 of the yoke under the effect of the first pull-back spring 25.

The shifting of the accelerator pedal 3 with respect to the yoke 21 engages the automative cruise control system. The potentiometrical sensor, which then measures the shift of the accelerator pedal 3 with respect to the yoke, for example converts this mechanical information into an electrical value. To this end, in a known electrical circuit, the potentiometrical sensor delivers a voltage or a current I that progresses, by its variation of resistance, until it crosses a voltage or current threshold. A comparison circuit for example compares the output value of the potentiometrical sensor with the given threshold value. This comparison can be made by digital or analog circuits. The engagement command thus made is for example taken into account by a circuit that puts the automative cruise control system into operation. The acceleration and/or the braking is then automatically taken into account by the system. By its second pull-back spring 27, whose force is greater than that of the first pull-back spring 25, the device according to the invention enables for example the accelerator pedal to serve as a foot rest. If the driver wishes to impose his own acceleration, then he presses his foot more forcefully on the accelerator which enters its second travel part.

Figure 3:
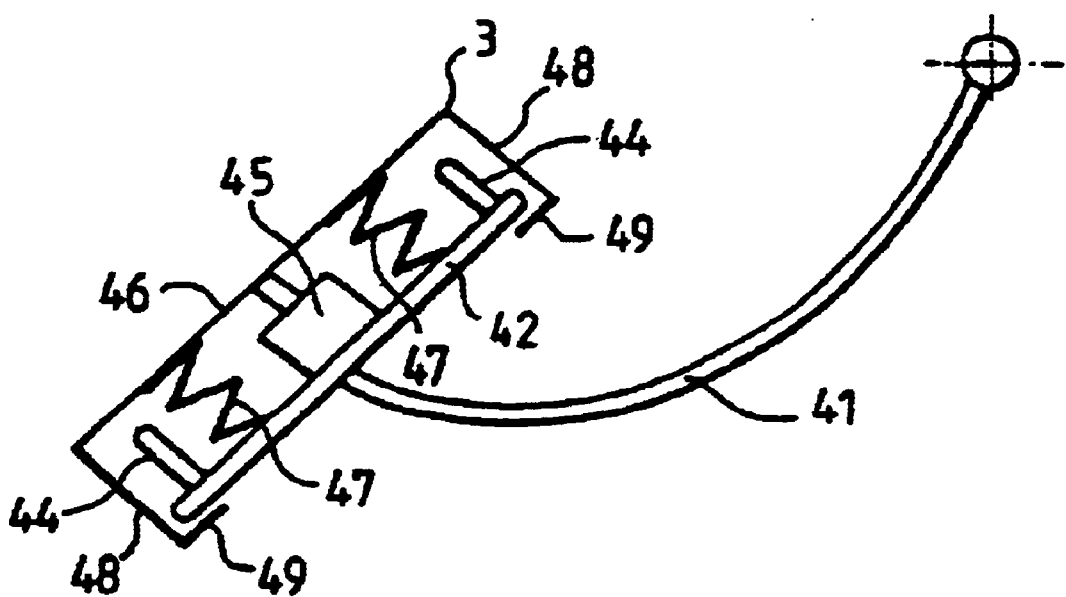
FIG. 3 shows another possible exemplary embodiment of a device according to the invention.

FIG. 3 shows another possible embodiment of a device according to the invention. The means for dividing the travel of the accelerator pedal into two parts comprise a support 42, for example a tray, that is rigidly connected to the arm 41 of the accelerator pedal 3 of the vehicle, for example by forming an integral part of the arm 41. The means for dividing the travel of the accelerator pedal comprise for example a jacket 46 whose upper face forms the accelerator pedal proper, more particularly, the support that receives the driver's foot.

The jacket 46 is fixedly joined mechanically to the support 42 and is movable with respect to this support. It is kept in an upper position by a pull-back force when there is no pressure exerted by the driver's foot. This pull-back force is smaller than the one associated with the arm 41 of the accelerator pedal so that, when the driver places his foot on the yoke, for example up to a stop 44, the arm 41 of the accelerator pedal is not activated, remaining substantially immobile, and thus does not give rise to any acceleration. The shifting of the jacket 46 with respect to the support 42 corresponds to the first travel part of the accelerator pedal 3.

The jacket 46 is held for example in the upper position by one or more pull-back springs 47 positioned between the inside of this jacket and the support 42. When the jacket 46 is mobile between the upper position, when the driver's foot is absent, and a position where it reaches a stop 44 that is fixedly joined to the support 2, then by pushing the jacket further ahead, the driver acts on the arm 41 of the accelerator pedal 3. The motion of this arm then activates the acceleration of the vehicle and corresponds to the second travel part of the accelerator pedal 3. The pull-back force of the jacket 46 is preferably substantially lower than the pull-back force of the arm 41 so that the driver's foot for example can rest on the jacket without any activation of the acceleration by the pedal. A motion sensor 45 is placed for example between the interior of the jacket 46 and the support 42. This sensor may be a switch or a selector having, for example, the form of a push-button. This push-button, which is mounted for example in series with an electrical circuit, sends an <<on>> command to the automative cruise control system. It is of course possible to use a potentiometrical sensor as for example in the above exemplary embodiment. In this example, it is also possible to use a selector switch type sensor to send an <<on>> command with reference to the shifting of the accelerator pedal in the first travel part.

To make it easier to shift the jacket 46 with respect to the support 42, that part of the support 42 that receives the driver's foot and that, is for example, tray-shaped extends for example perpendicularly towards the support. This support then shifts between the part 48 thus extended. A slight clearance is provided between the support 42 and this part 48 so as to guide the motion of the jacket 46. Preferably, the jacket has an additional part 49 that folds down so as to cover the support in varying degrees in such a way that the upward motion of the jacket is held back by this folded part 49. Thus, the shifting of the jacket with respect to the support is limited downwards by the stop 44 and is limited upwards by the folded jacket part 49. A simpler embodiment may for example consist in keeping only the upper part of the jacket 46, namely the part that is in contact with the driver's foot and forms the upper face of the accelerator pedal.

The exemplary embodiments shown with reference to FIGS. 2 and 3 have means 2 for dividing the travel of the accelerator pedal that are mechanical. It is possible to envisage means for dividing the travel of the accelerator pedal that are not mechanical but are for example electronic or optical. A sensor then measures the position of the pedal. Up to a given angle of shift of the pedal, corresponding to its first travel part, a command for turning on the automative cruise control system is created. Starting with this angle of shift, from which the second travel part of the pedal begins, the measurement of shift done by the sensor is then converted for example into an acceleration command. It is also possible to provide for another embodiment where, during the first travel part, determined by the sensor, the acceleration command produced by the pedal is deactivated by a system controlled by signals given by the sensor.

It must be noted that the means 2 for dividing the travel of the accelerator pedal may be activated as soon as the command is given to turn on the control system. In this case, the lock 30 of the embodiment shown in FIG. 2 may for example be eliminated.

The advantage of the invention, in particular, is that it is simple to make. The modification entailed by the acceleration system is indeed not very great. It furthermore provides for great security of operation. In particular, in the embodiment of FIG. 2, when the electromagnet controlling the latch 30 is not powered, the accelerator pedal remains blocked between the upper stop 23 of the yoke and the latch. Full command over acceleration is then transferred to the driver. This is also the case more generally when there is any malfunction in the electrical power supply.

The invention furthermore makes it possible to increase the safety of the driver and his passengers. Indeed, the first travel part of the accelerator, which is associated with a pull-back spring 25 having lower force, preferably substantially lower than the pull-back force of the spring associated with the second travel part, which corresponds especially to the pull-back force of the accelerator in the normal acceleration phase, when there is no automatic system, gives the driver clear information on the state of the system. Through this first travel part, the driver knows that the automative control system is active. This tactile information is more reliable than any visible information which the driver cannot look at constantly. Furthermore, it provides greater security because it does not divert the driver's visual attention. It is also more reliable and more secure than any auditory information which in particular may be cloaked by ambient noise and may even disturb the driver.

Finally, the invention provides driving comfort to the driver. In particular, during periods of automatic driving, the driver's right foot may rest on the intermediate stop of the accelerator pedal. The driver does not have to think to find out where he should put his foot or know which state his system is in. He can instantaneously and very naturally take over in dangerous or critical situations.

It must be noted that the invention furthermore enables a setting of the instructed speed value by the accelerator pedal. Indeed, since a depression of the accelerator pedal in the first travel part 311 engages the cruise control system it is possible, in this first travel part, to plan for a setting of the instructed speed value between the value zero and a preselected value. This setting of an instructed speed may be done for example as a function of the degree of depression of the accelerator pedal 3 inside the first travel part 311, the instructed speed increasing with the degree of depression. The instructed value is for example given by the potentiometrical sensor or by any other means measuring the shift of the pedal with respect to the yoke. This instructed value is for example taken into account by the control system during an initialization phase, for example after the command for engaging the system. Changes in instructed may nevertheless be planned for during operation. It is then necessary to provide for a signal that informs the control system that it must take account of the degree of depression of the pedal, represented for example by the value of the associated potentiometrical sensor.

Finally, the accelerator pedal 3 and the yoke 21 have been presented as carrying out rotational motions. The principle of an embodiment shown in FIG. 2 could be applied however to a case of rectilinear motions. Furthermore, the invention has been presented with reference to an accelerator pedal activated by the foot. It can nevertheless be applied to any other means of acceleration, whether of the pedal type or not, activated by an organ other than the foot, for example the hand.

The means of measuring distance and/or speed mentioned here above use radar techniques. The invention is of course applicable to other means of detection, for example based on optical techniques.

What is claimed is:

1. A device for operating a cruise control system for a vehicle, comprising means to separate a travel of an accelerator pedal into first and second parts, depression of the pedal being less in the first travel part than in the second travel part, depressing the pedal in the first travel part engaging the cruise control system and a pull-back force of the pedal being smaller in the first travel part than in the second travel part;

wherein the second travel part controls the acceleration of the vehicle; and wherein the means for separating the travel of the accelerator pedal into two parts comprise a yoke provided with an upper stop and a lower stop, the pedal being mobile between these two stops, the shifting of the yoke activating the acceleration of the vehicle, the first travel part being constituted by the shifting of the pedal with respect to the yoke and the second travel part being constituted by the shifting of the yoke.

2. A device according to claim 1, wherein the accelerator pedal is kept fixed with respect to the yoke when the cruise control system is not activated.

3. A device according to claim 1 wherein, with the accelerator pedal being pulled back to the upper stop of the yoke by a first spring and the yoke being pull back upward by a second spring, the first spring has a pull-back force lower than that of the second spring.

4. A device according to claim 1, comprising a sensor that measures the shifting of the yoke, the acceleration of the vehicle being a function the measurement.

5. A device according to claim 1, comprising a sensor that measures the shifting of the accelerator pedal with respect to the yoke, the measurement of the shift being based on a command for the engaging of the automatic control system.

6. A device for operating a cruise control system for a vehicle, comprising means to separate a travel of an accelerator pedal into first and second parts, depression of the pedal being less in the first travel part than in the second travel part, depressing the pedal in the first travel part engaging the cruise control system and a pull-back force of the pedal being smaller in the first travel part than in the second travel part;

wherein the second travel part controls the acceleration of the vehicle; and wherein the pedal is held towards an upper stop by an actuatable element.

7. A device according to claim 6, wherein the actuatable element is the latch of a lock controlled by an electromagnet.

8. device according to claim 7, wherein the latch is in the position of blocking the accelerator pedal with respect to the yoke when the electromagnet is not crossed by a current.

* * * * *